B. P. ROWE.
CONNECTOR.
APPLICATION FILED JULY 13, 1914.

1,236,766.

Patented Aug. 14, 1917.

WITNESSES:
Clarence E. Myers
O. W. Kennedy

INVENTOR
Bertrand P. Rowe.
BY
Wesley G. Carr
ATTORNEY

UNITED STATES PATENT OFFICE.

BERTRAND P. ROWE, OF WILKINSBURG, PENNSYLVANIA, ASSIGNOR TO WESTINGHOUSE ELECTRIC AND MANUFACTURING COMPANY, A CORPORATION OF PENNSYLVANIA.

CONNECTOR.

1,236,766.  Specification of Letters Patent.  Patented Aug. 14, 1917.

Application filed July 13, 1914. Serial No. 850,740.

*To all whom it may concern:*

Be it known that I, BERTRAND P. ROWE, a citizen of the United States, and a resident of Wilkinsburg, in the county of Allegheny and State of Pennsylvania, have invented a new and useful Improvement in Connectors, of which the following is a specification.

My invention relates to connectors for electric conductors and it has for its object to provide a simple and efficient three-way connector and an efficient and inexpensive method of constructing such connectors from metal tubing.

Heretofore, three-way connectors have been constructed from single castings or moldings, with the accompanying use of set screws, solder or threads to retain the conductors within the connector members. Metals which are cast in molds suffer an appreciable loss in conductivity as compared with pure metal, on account of the introduction of fluxes or metal alloys to facilitate casting. Metal tubing, however, may ordinarily be obtained of nearly pure metal and of relatively high conductivity.

By the use of my invention, a connector may be constructed from two portions of metal tubing and may be utilized without the addition of any other parts. A connector so constructed will require a smaller amount of metal than a cast metal connector designed for the same current-carrying capacity, owing to the higher conductivity of the metal tubing.

Figure 3:
Figure 1:
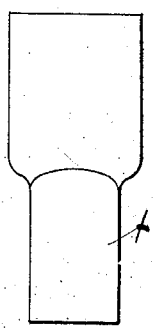
Figure 2:
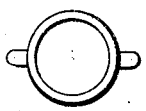
Figure 4:
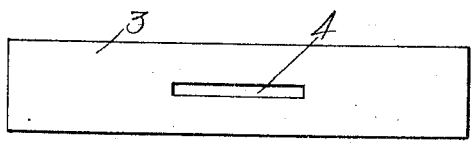
Figure 5:
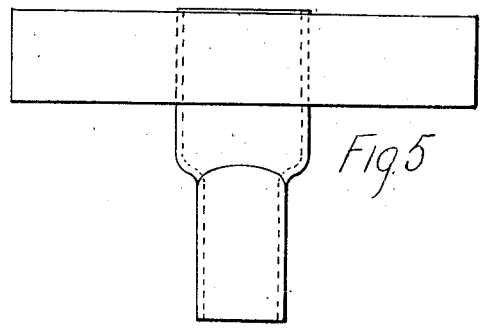
Figure 6:
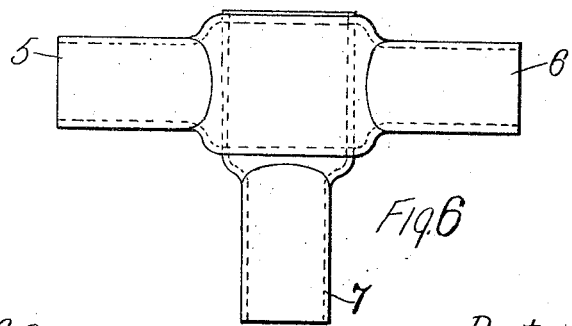

Figure 1 of the accompanying drawing is a plan view of a piece of tubing after the first operation has been performed in the construction of a connector according to my invention; Fig. 2 is an end elevational view of the tube shown in Fig. 1; Fig. 3 is a side elevational view of the tube shown in Fig. 2; Fig. 4 is a plan view of a piece of tubing after the second operation in forming the connector has been performed; Fig. 5 is a plan view of both pieces of tubing after the third operation in forming the connector has been performed; Fig. 6 is a plan view of both pieces of tubing after the fourth or final operation in forming the connector has been performed.

A portion of metal tube 1 is compressed to form a substantially flat section 2. A second portion of metal tube 3 is slotted, as shown in Fig. 4, the slot 4 being of such shape as to conform closely to the cross sectional area of the flat section 2. The flattened portion 2 of member 1 is next inserted in the slot 4, as shown in Fig. 5 of the drawing, the inside of the member 3 and the flattened portion of member 1, having first been tinned. The portion of metal tube 3, above and below the slot, is then compressed and forced into intimate contact with the flattened portion 2, already within the slot. The two portions are then sweated together to form the completed device shown in Fig. 6. If desired, the flattened section may be provided with indentations made by a suitable punch to prevent the assembled members from separating, upon the application of heat. The completed connector comprises receptacles or sockets 5, 6 and 7 into which may be soldered cables or other conductors. It is not necessary that the cross sectional areas of the conductors be the same, as the tubular members forming the completed device may be of different sizes, if desired.

While I have shown my invention in its simplest and preferred form, it is not so limited, but is capable of various modifications within the scope of the appended claims.

I claim as my invention:

1. A connector for electric conductors comprising a tubular member having a flattened slitted portion intermediate its ends, and a second tubular member flattened at one end, the flattened end of the second member registering with, and secured in, the slit in the first mentioned tubular member.

2. A three-way connector for electric conductors comprising a tubular member having an integral flattened intermediate portion provided with an opening therein, and a tubular member having a flattened end portion that registers with and is secured in the opening in the flattened intermediate portion of the other tubular member.

3. A three-way connector for electric conductors comprising a tubular member having an integral flattened intermediate portion that is provided with an opening, and a tubular member having a flattened end portion that is secured in the opening of the flattened intermediate portion of the other member.

4. A three-way connector for electric conductors comprising two metal tubes, one of the said tubes being flattened intermediate its ends and provided with an opening therein, and the other tube being flattened at one of its ends and its flattened end being disposed in the opening in the flattened portion of the other tube.

5. A connector comprising two metal tubes, one of the said tubes being slitted and flattened intermediate its ends and the other tube being flattened at one end and secured within the slit in the other tube.

6. A connector comprising two metal tubes, one of the said tubes being slitted and flattened over a portion of its length and the other tube being flattened at one end and secured in the slit in the other tube.

7. A connector comprising two metal tubes, one of the said tubes being provided with a slit intermediate its ends, the other tube being flattened over a portion of its length and the flattened portion being disposed in the slit, the two tubes being secured together by flattening a portion of the slitted tube.

In testimony whereof, I have hereunto subscribed my name this 30th day of June, 1914.

BERTRAND P. ROWE.

Witnesses:
B. B. HINES,
M. C. MERZ.